Aug. 11, 1970    E. L. KILBOURN    3,524,159
ELECTRIC BRAKE CONTROL

Filed Jan. 8, 1968    2 Sheets-Sheet 1

INVENTOR
EUGENE L. KILBOURN
BY Beaman & Beaman
ATTORNEYS

Aug. 11, 1970 — E. L. KILBOURN — 3,524,159
ELECTRIC BRAKE CONTROL

Filed Jan. 8, 1968 — 2 Sheets-Sheet 2

INVENTOR
EUGENE L. KILBOURN
BY Beaman & Beaman
ATTORNEYS

United States Patent Office 3,524,159
Patented Aug. 11, 1970

3,524,159
ELECTRIC BRAKE CONTROL
Eugene L. Kilbourn, Marshall, Mich., assignor to Tekonsha Engineering Company, Tekonsha, Mich., a corporation of Michigan
Filed Jan. 8, 1968, Ser. No. 696,176
Int. Cl. H01c 3/00
U.S. Cl. 338—92                  8 Claims

ABSTRACT OF THE DISCLOSURE

A control for vehicles having electric brakes wherein the control consists of an elongated resistor element engaged at various longitudinal positions having different resistance characteristics by contacts of relatively limited area producing an efficient electrical connection between the contacts and resistor element. A plurality of contacts are employed which are biased toward the resistor element to permit the contacts to be sequentially and progressively established in conducting relationship to the element.

BACKGROUND OF THE INVENTION

The invention pertains to the field of electric brake controllers of the variable resistance type whereby increased voltage and current for operating an electrical brake is produced by movement of a contact support which varies the electrical resistance passing through the control.

The brake controller in accord with the invention is preferably of the type that is used in controlling the braking of towed trailers attached to automobiles or trucks. Heavy trailers, such as house trailers, mobile homes, and the like, often require braking systems separate from the automobile brakes in order to meet the necessary safety requirements. Such trailer braking systems are usually electric in character, rather than hydraulic, due to the more ready adaptation and control of electric brakes to this type of application.

A number of patents represent the state of the prior art. The prior patents show both automatic and manual means for applying and controlling the braking of the towed vehicle, and many of the electrical brake devices which would be considered within the same art as the invention employ variable resistance rheostats for control purposes. The state of the prior art is represented by U.S. Pats. 2,779,443; 2,829,225; 2,856,036 and 3,034,598. The device shown in Pat. 2,829,225 is used in a manner somewhat similar to that disclosed in the invention, and it is this type of brake control over which the invention is considered to be a significant advance.

Electric brake controllers using variable rheostats must be of dependable operation, even though the rheostat will be subjected to heavy dust and dirt conditions due to its use and mounting upon a vehicle. In a variable resistance rheostat a contact will wipe or otherwise engage a coil or other type of resistor element at various locations to produce the desired electrical resistance. Dust, dirt, grease and other foreign matter tends to accumulate upon the wiper or contact, with the result that over a period of time an effective electrical connection may no longer occur between the contact and the resistor element due to the accumulation of dirt. Such a condition could result in a momentary malfunction of the brake, and under some conditions could prevent the brake from operating altogether creating a serious safety hazard.

SUMMARY OF THE INVENTION

A basic purpose and object of the invention is to provide an electric brake control for vehicles, such as trailers, which is of a concise and attractive appearance, which may be readily mounted within the passenger compartment of the towing vehicle, and will provide effective and efficient brake control over long periods of time with a minimum opportunity for malfunction.

In the practice of the invention the control consists of a housing or support member which may be affixed to the steering column or dashboard of the towing vehicle. A resistor element is located within the housing which may be in the form of a spirally wound coil mounted upon a cylindrical core. One end of the coil is attached to an electrical conductor supplying the trailer brake. An arm is pivotally mounted in the housing and contains a plurality of contacts which are movably mounted on the arm in a direction substantially parallel to the direction of movement of the arm toward and away from the resistor element. The contacts are spaced from each other to define a plurality of contact points which are linearly disposed, and will sequentially and progressively engage the resistor element along its longitudinal length as the arm is pivoted toward the resistor. An electrical conductor supplying electrical current is connected to the contacts, and biasing means mounted upon the arm bias the contacts toward the resistor, yet permit the contacts to move relative to the arm once they have engaged the resistor. The further the arm is pivoted toward the resistor, the greater the number of contacts that engage the resistor, and the less the resistance passing through the controller.

A brake light terminal, and a resistor by-pass terminal are mounted upon the resistor at opposite ends thereof. A contact is mounted upon the arm that makes initial engagement with the brake light terminal to illuminate the brake lights as soon as the brake control begins operation. A resistor by-pass contact mounted upon the arm will make direct engagement with the resistor by-pass terminal upon the arm being pivoted its maximum extent toward the resistor, to permit an unrestricted electrical flow through the controller for maximum braking.

In order to permit automatic operation of the controller a cylinder and piston is mounted upon the housing which is connected to the hydraulic braking system of the towing vehicle, such as an automobile. Thus, upon application of the brakes of the automobile, the arm will be automatically pivoted toward the resistor to produce a flow of current to the trailer brakes proportionate to the amount of braking occurring in the vehicle.

The arm may also be manually pivoted toward the resistor whereby the trailer brakes may be applied independently of the automobile brakes.

Another object of the invention is to provide a brake controller wherein spring means bias the contact supporting arm away from the resistor, and the biasing force of the spring means may be adjusted and regulated to suit the braking conditions required for a given weight trailer.

BRIEF DESCRIPTION OF THE DRAWINGS

The advantages and improvements attendant with the construction of a brake control in accord with the invention will be appreciated from the following description and accompanying drawings wherein:

FIG. 3 is a plan, sectional view of a brake control in accord with the invention illustrating the contact supporting arm in the normal, nonoperative position in full lines, and the position of the contacts during maximum braking being indicated in dotted lines, and FIG. 4 is a sectional, detail view of the contacts and resistor element during a partial application of electrical current to the vehicle brakes.

DESCRIPTION OF THE PREFERRED EMBODIMENT

The invention is disclosed in a form which may be considered an accessory for an automobile or truck which is used to tow trailers having electrical brake systems. Of course, the principles of the invention can be used in other environments than that illustrated, and the described embodiment is for purposes of setting forth the inventive concepts.

Figure 1:
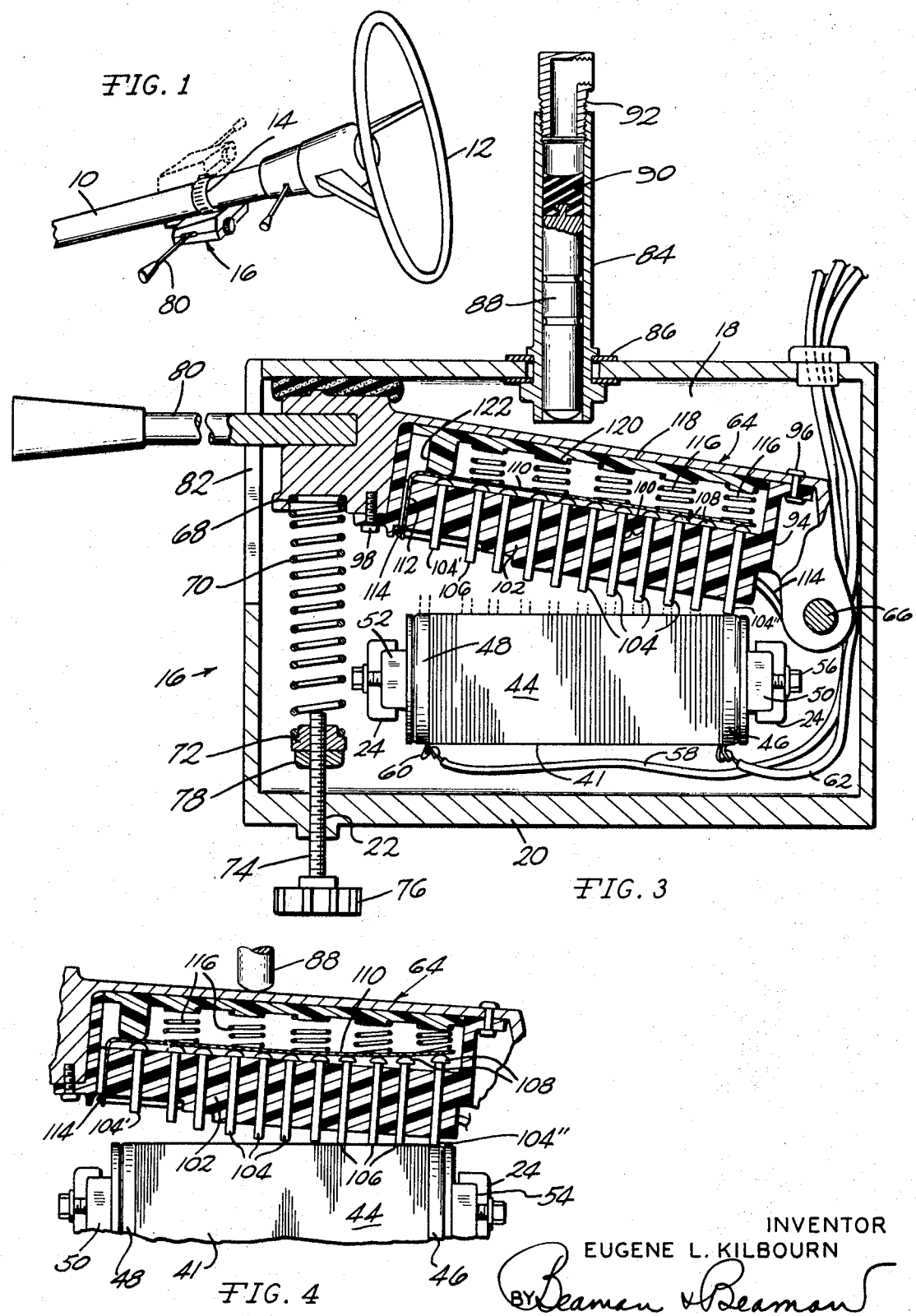
FIG. 1 is a perspective view of a brake control in accord with the invention as mounted upon the steering column of the towing vehicle, such as an automobile, an alternate mounting position being shown in dotted lines.

FIG. 1 indicates how a brake control in accord with the invention may be mounted upon the steering column of the towing vehicle. The steering column 10 supports the usual vehicle steering wheel 12. The steering column illustrated is of a cylindrical configuration, and a clamping band 14 is disposed about the steering column below the steering wheel to serve as a means for mounting the brake control housing or support member, generally indicated at 16, to the steering column. The clamping ring passes through slots formed in either the top or the bottom of the brake control housing structure, and in this manner the brake control can be mounted in a position accessible to the driver, yet will not be located as to be objectionable due to obstructing the driver's leg room or vision. In this respect the configuration of the device in accord with the invention is an advantage over prior art devices in that the vertical dimensions and profile are kept to a minimum. In the preferred commercial embodiment, the maximum vertical dimension of the controller housing is approximately one and one-half inches.

By locating the slots in the control housing in both the top and bottom, the band 14 can be selectively associated with the housing such that the housing can be mounted below the column 10, as shown in full lines in FIG. 1, or mounted above the column as represented in dotted lines. It is also possible to mount the housing 16 upon or below the vehicle dashboard by using a suitable adapter bracket, not shown.

Figure 2:
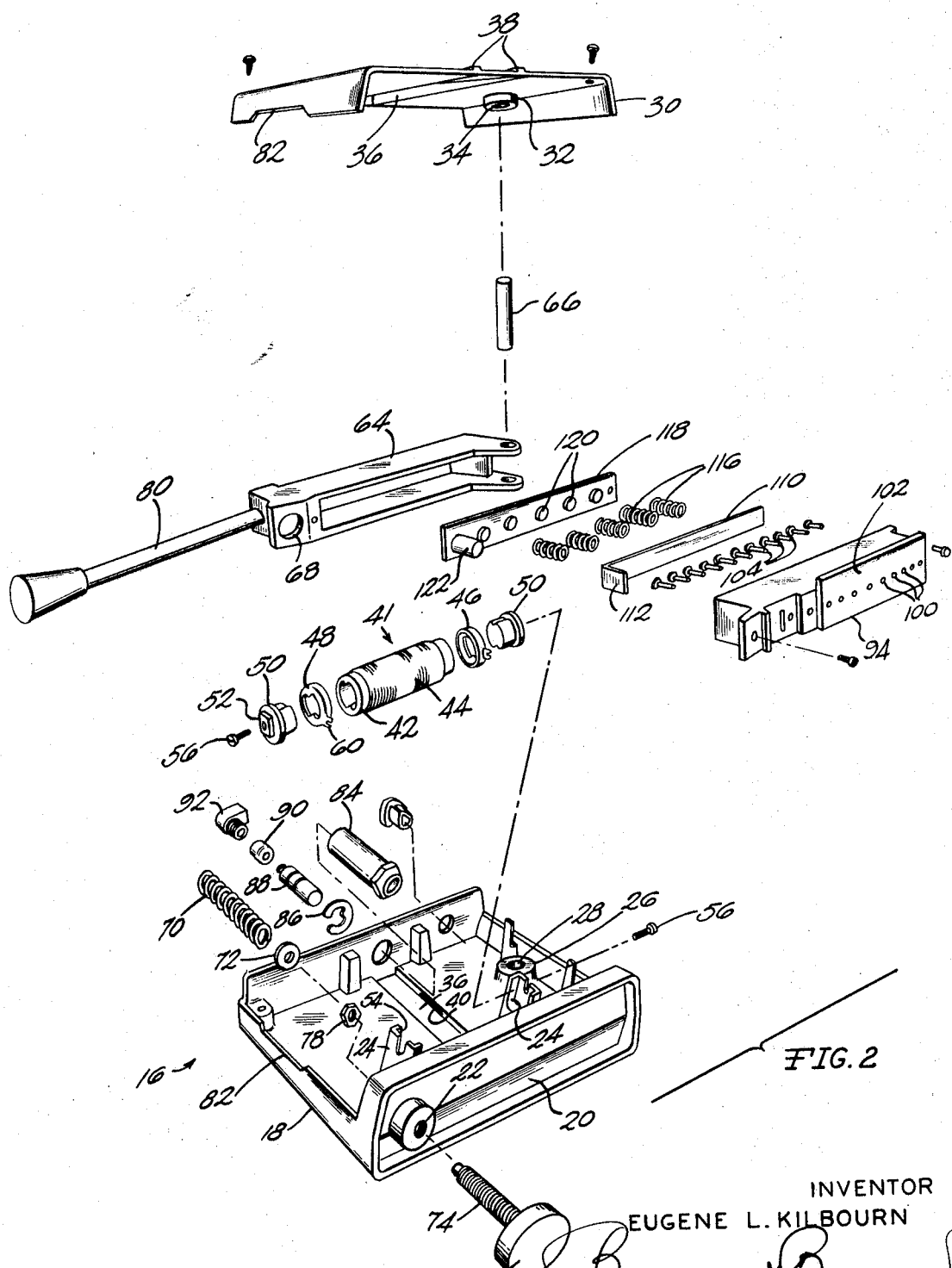
FIG. 2 is an exploded perspective view of a brake control in accord with the invention.

With reference to FIG. 2, the components of the preferred embodiment will be most clearly appreciated. The control housing 16 includes a bottom portion support member 18 preferably formed of a cast construction, and may be die cast of metal. The housing portion 18 includes a front panel 20 having a boss formed therein having a threaded bore 22 which extends through the panel. A pair of spaced resistor element support projections 24 arise from the lower wall of the support member, as shown in FIG. 2, and an annular projection 26 is also integrally formed on the support member having a bore 28 defined therein for receiving the contact arm pivot pin as will be later described.

The housing portion member 18 is enclosed by a cover plate 30 which is mounted upon the member by means of screws threaded into appropriate holes formed on the support member 18. The cover plate 30 includes an integral boss 32 having a bore 34 formed therein for receiving the other end of the contact arm pivot, and the bore 34 will coaxially align with the bore 28 upon the cover being located upon the support member 18.

Both the support member 18 and the cover 30 are centrally formed with an outwardly extending portion 36 including a pair of spaced ribs 38. A pair of opposed slots 40 formed on opposite sides of the portions 36 permit the band 14 to be selectively inserted through the slots of either the cover 30 or the support member 18. In this manner the column 10 engages the ribs 38 to center the housing 16 on the column and the control may be selectively mounted upon the vehicle steering column in a variety of positions, as mentioned above, which will cause the manual operating handle to extend to either the left or the right of the steering column.

The resistor element illustrated consists of a coil 41 comprising a cylindrical dielectric core 42 formed of ceramic upon which resistance wire 44 is spirally wound. A stop light terminal ring 46 is located upon one end of the core, and the resistor by-pass terminal ring 48 is mounted upon the other end of the core. Core adapters 50 of dielectric material, such as nylon, are inserted through the terminal rings into the interior of the core to maintain the assembly and these adapters include rectangular bosses 52 adapted to be received with the complementary recesses 54 of the support member projections 24. Screws 56 thread into the adapters to maintain the resistor element assembly in position on member 18, FIG. 3.

An electrical conductor 58 is connected to the terminal 60 defined on the by-pass ring 48, and the adjacent end of the resistance wire 44 is likewise connected to this terminal. The conductor 58 is connected to the trailer brake circuit.

A conductor 62 is attached to the terminal of the stop light ring 46 and this conductor is attached to the towing and towed vehicle's stop light system.

A contact supporting arm 64 is pivotably mounted upon the support member 18. The arm 64 is mounted upon the pivot pin 66 received within support member bore 28 and cover bore 34, and it is significant to note that the linear elongated portion of the resistor coil 41 disposed nearest the arm 64 is in substantial alignment with the center of the pivot pin 66, FIG. 3.

The arm 64 includes a channel-shaped central configuration in which the contact structure is located. A recess 68 is formed adjacent the free end of the arm to receive a compression spring 70. The other end of the compression spring 70 engages a pad 72 threaded upon screw 74 which is threaded into the support member bore 22. The screw 74 is formed with a knob 76 which permits rotation of the screw, and movement of the pad 72, and its lock nut 78, toward and away from the outer end of the arm 64. Adjustment of the screw 74 thereby varies the initial compression of the spring 70, which varies the magnitude of the biasing force biasing the arm 64 away from the resistor coil 41.

A manual operating handle 80 is mounted on the outer end of the arm 64 and extends through a slot formed in the housing 16 by appropriate clearance portions 82 defined in the support member 18 and the cover 30.

Automatic operation of the control is accomplished through a cylinder 84 affixed to the rear wall of the support member by means of an E-ring 86. The cylinder 84 includes a hydraulic piston 88 mounted therein having an outer end in alignment with the arm 64, FIG. 3, and an inner end having a button formed thereon upon which the seal 90 is affixed. The elbow fitting 92 screwed into the end of the cylinder permits the outer end of the cylinder to be connected to the hydraulic brake system of the towing vehicle, and upon the cylinder 84 being connected to the brake system of the towing vehicle, it will be appreciated that pressurization of the vehicle brake fluid will force the piston 88 toward the arm 64, to pivot the arm toward the resistor coil 41. Spring 70 will return the piston to its initial position, once the hydraulic braking fluid pressure has been released.

The electrical contacts are mounted within a dielectric housing or guide 94 which may be molded of a plastic material. The end of the housing 94 adjacent the pivot 66 is affixed to the arm 64 by a rivet 96, while the end adjacent the spring 70 is affixed to the arm by a screw 98. The guide 94 includes a plurality of parallel holes or bores 100 formed in the wall 102 thereof. The bores 100 are of a cylindrical configuration and are spaced apart in such a manner as to define a linear series of bores in lateral alignment with that portion of the resistance element coil 41 disposed toward the arm.

A plurality of electrical contacts, in the form of brass pins 104 of cylindrical configuration each having an outer end 106, and an inner headed end 108, are slidably received within the guide bores 100. The guide bores maintain the pins in spaced relationship with each other wherein the outer ends 106 of the pins form a series of contact points linearly disposed in a laterally offset relationship to the resistor element coil 41.

A brass contact strip 110 is disposed immediately behind the inner headed ends 108 of the contact pins to engage therewith. The brass strip 110 is of a flexible nature, and includes an offset end 112 which extends through the guide wall 102 whereby an electrical conductor 114 may be soldered thereto. The electrical conductor 114 is connected to the battery or other power source of the towing vehicle. Thus, it will be appreciated that the contact pins 104 will be electrically connected to the vehicle power source.

The strip 110 is maintained in contact with the headed inner ends of the contact pins 104, and the contact pins are normally maintained in their outermost position as shown in FIG. 3, by a plurality of compression springs 116 interposed between the strip and a dielectric base 118. The base 118 includes a plurality of spring positioning projections 120 whereby the five illustrated springs may be maintained in spaced relationship.

The base 118 also includes an elongated projection 122 disposed behind the strip portion 112 for contact with the strip. The projection 122 is not compressible, and is disposed behind the resistor bypass contact pin 104′, for a purpose which will be later described.

The brake light contact pin is represented at 104″ and is also in contact with the strip 110 as is appreciated from FIG. 3.

In operation, the brake control housing 16 will be mounted within the towing vehicle, such as upon the steering column 10 as shown in FIG. 1, or mounted upon the underside of the dashboard or other suitable structure. The towing vehicle hydraulic cranking circuit is connected to the cylinder 84 through fitting 92 by suitable tubing, and, as mentioned above, the conductor 58 is connected to the trailer brake circuit, the conductor 62 is connected to the stop light circuit, and the conductor 114 is connected to the power source.

The spring 70 will maintain the arm 64 biased away from the resistor coil 41 in the relationship shown in FIG. 3. Under this normal or inoperative condition the springs 116 will maintain the heads 108 of the contact pins 104 against the guide wall 102, and the outer ends 106 of the pins will be extending their maximum distance from the guide wall. The screw 74 will be adjusted by the knob 76 to produce the desired braking action for the weight trailer being towed. For instance, if it is desired that "heavy" braking be accomplished, the screw will be rotated to minimize the tension within the spring 70. If "light" braking is required the screw 74 will be rotated to provide a high initial compression upon the spring.

When the brakes of the towing vehicle are applied, the resultant increase in pressure within the cylinder 84 will cause the piston 88 to engage the back side of the arm 64 and pivot the arm about the pivot 66. As the arm is pivoted toward the resistor coil 41 the first connection therewith will be made by the brake light contact pin 104″ with the contact ring 46. Completion of this circuit will illuminate the brake lights and indicate that the brakes are being applied.

Further rotation of the arm 64 toward the resistor coil 41 causes the outer ends 106 of those contact pins 104 closest to the pin 104″ to begin progressively engaging the coils of the resistance wire 44. The contact pin nearest the brake light pin 104″ will be the first to engage the coil 41, and permit a low current flow from the conductor 114 and strip 110 through the coil to the trailer brake circuit through conductor 58. As continued rotation of the arm occurs during braking sequential progression of contact of the contact pins 106 occurs toward the left, FIGS. 3 and 4. FIG. 4 indicates a condition when approximately half of the contact pins 104 are in engagement with the resistor coil 41. As the arm 64 continues to rotate toward the coil the resistance of the electrical circuit between the conductor 114 and the conductor 58 is reduced to permit higher capacities of electrical current to be applied to the conductor 58. From FIG. 4 it will be noted that upon engagement with the coil 41, the pins 104 will remain stationary and pivoting of the arm 64 causes the springs 116 behind the engaged contact pins to begin compressing under the deformation occurring in the strip 110. The further the arm 64 is pivoted toward the resistor coil 41, the greater the electrical current flow through the brake conductor 58.

When the operator ceases braking the relieving of the hydraulic pressure within the cylinder 84 will permit the spring 70 to bias the arm 64 in the clockwise direction, FIG. 3, and progressively remove the braking current from the trailer brakes. Thus, a smooth and variable braking control of the brakes is accomplished.

When maximum braking conditions are required the arm 64 will be rotated the maximum degree toward the resistor coil 41. This condition will place all of the contact pins in engagement with the resistor coil as indicated in dotted lines in FIG. 3. Full rotation of the arm toward the resistor coil causes the bypass contact 104′ to engage the bypass contact ring 48 and this engagement establishes a direct connection between the conductor 58 and the conductor 114, bypassing the coils of the resistor, and permitting a maximum current flow through the control. As the base projection 122 is disposed behind the contact pin 104′, the contact pin 104′ does not axially slide within its bore 100, as do the other contact pins and thus the pin 104′ will serve as a stop to limit counterclockwise rotation of the arm, FIG. 3.

It will be noted from FIG. 3 that the linear relationship assumed by the contact outer ends when the arm is pivoted its maximum extent in a counterclockwise direction, as represented in dotted lines, produces a line which substantially extends through the center of the arm pivot 66. Thus, when the arm is pivoted its maximum extent the guide 102 will be substantially parallel to the axis of the resistor coil 41, and the most favorable relationship between the contact pins and resistor coil is accomplished.

The disclosed construction is most effective to permit an efficient connection between the conductors 58 and 114, which is not likely to be adversely affected by dirt or foreign matter interfering between the engagement of the pin outer ends 106 with the resistance coil. The area of the contact pins outer ends 106 is relatively limited. In the commerical embodiment the diameter of the contact pins is approximately 3/32 of an inch, and thus the area pressure of the pins' inner ends with the resistor coil wire 44 is relatively high due to the biasing force produced by the springs 116. Also, as the arm 64 rotates toward the resistor coil 41 there is a small longitudinal wiping action of the contact pins' outer ends over the coil which is helpful in keeping the outer ends clean. Due to the nonresilient characteristics of the bypass contact pin 104′ the contact pressure between pin 104′ and the ring 48 is determined by the force imposed upon the arm 64. Thus, very high area pressures may exist between the pin 104′ and the ring 48 to insure maximum braking capabilities, which is most important under emergency conditions.

The vehicle operator often desires to apply the trailer brakes without applying the towing vehicle brakes, and this operation is easily accomplished by means of the handle 80, wherein the arm 64 may be manually pivoted toward the resistor coil 41. Under manual operation, the sequence of operation of the control is identical to that produced above as occurring under the influence of the hydraulic braking pressure.

What is claimed is:

1. An electric brake control comprising, in combination, a supporting member, an elongated electrical resistor element mounted upon said member having an electrical connection at one end, a contact member pivotally mounted on said supporting member for movement toward and away from said resistor element, a plurality of individual, spaced contacts mounted on said contact member, said contacts being spaced relative to each other to define a series of contact points extending in the general longitudinal direction of said resistor element and in lateral alignment therewith, means mounting said contacts on said contact member for movement relative thereto in the general direction of movement of said contact member toward and away from said resistor element, biasing means mounted on said contact member biasing said contacts toward said resistor element, and electrical conducting means connected to said contacts, said contacts sequentially and progressively engaging and disengaging said resistor element along its length upon said contact member moving toward and away from said resistor element, respectively, producing an electrical circuit between said resistor element and said electrical conducting means having a resistance determined by the longitudinal location of engagement of contacts on said resistor element.

2. In an electric brake control as in claim 1 wherein said contact member is of an elongated form, and includes a dielectric guide, a plurality of guide bores defined in said guide generally extending in the direction toward said electrical resistor element, said contacts being of elongated form having outer and inner ends and slidably received within said guide bores, said contacts' outer ends extending toward said resistor element, and said biasing means mounted on said contact member comprising springs mounted upon said contact member imposing a biasing force upon said contacts' inner ends.

3. An electric brake control as in claim 1, a resistor bypass terminal mounted upon and connected to said resistor element at the end of said resistor element to which said electrical connection is connected, a resistor bypass contact mounted upon said contact member in alignment with said bypass terminal upon said contact member being moved toward said resistor element the maximum extent, said bypass contact being connected to said electrical conducting means.

4. An electric brake control as in claim 1 wherein spring means are mounted on said supporting member in engagement with said contact member biasing said contact member away from said resistor element, and spring adjustment means associated with said spring permitting adjustment of the biasing force produced thereby.

5. In an electric brake control as in claim 1 wherein said contact member comprises an arm pivotally mounted on said supporting member having a radial portion movable toward and away from said resistor element, a handle mounted on said arm, said means mounting said contacts on said contact member mounting said contacts on said arm radial portion and spring means interposed between said arm and support member biasing said radial portion away from said resistor element.

6. In an electric brake control as in claim 5 wherein said means mounting said contacts on said arm radial portion includes a dielectric guide having a plurality of guide bores defined therein having axes transversely disposed to said arm radial portion, said contacts being of elongated form having outer and inner ends and slidably received within said guide bores, said contacts outer ends extending toward said resistor element, said biasing means biasing said contacts comprising springs mounted upon said arm imposing a biasing force upon said contacts' inner ends.

7. In an electric brake control as in claim 6 wherein said electrical conducting means connected to said contacts comprises a flexible metal strip engaging the inner ends of said contacts, said springs mounted on said arm engaging said metal strip wherein said strip is interposed between said contacts' inner ends and said springs.

8. An electric brake control as in claim 5, a resistor bypass terminal mounted upon and connected to said resistor element at the end of said resistor element to which said electrical connection is connected, a resistor bypass contact mounted upon said arm radial portion in alignment with said bypass terminal upon said arm portion being pivoted toward said resistor element the maximum extent, said bypass contact being connected to said electrical conducting means.

References Cited

UNITED STATES PATENTS

| 2,829,225 | 4/1958 | Ross | 338—39 |
|---|---|---|---|
| 3,328,739 | 6/1967 | McInnis et al. | 338—96 |
| 1,728,004 | 9/1929 | Norris | 338—153 |
| 2,551,523 | 5/1951 | Bacca | 338—39 |
| 2,134,323 | 10/1938 | Beach | 338—153 |
| 2,345,409 | 3/1944 | Mason | 338—96 |

FOREIGN PATENTS 529,789    12/1921    France.

LARAMIE E. ASKIN, Primary Examiner

A. T. GRIMLEY, Assistant Examiner

U.S. Cl. X.R.

338—39, 96, 97, 153, 202